May 31, 1960 T. EINSELE 2,939,119

CORE STORAGE MATRIX

Filed June 24, 1957

*INVENTOR.*
THEODOR EINSELE

*BY* Edward S. Drake

AGENT

United States Patent Office 2,939,119

Patented May 31, 1960

2,939,119

CORE STORAGE MATRIX

Theodor Einsele, Sindelfingen, Germany, assignor to International Business Machines Corporation, New York, N.Y., a corporation of New York Filed June 24, 1957, Ser. No. 667,625

Claims priority, application Germany June 30, 1956

9 Claims. (Cl. 340—174)

This invention relates to core storage devices, and particularly to novel switching arrangements employing semiconductive devices.

In recognized electronic computers, provision is frequently made for storing information in magnetic core matrix networks. Such networks comprise magnetic cores having a rectangular or substantially rectangular hysteresis loop, and consist principally of ferrite material. The cores, which are generally arranged in the form of a bi-directional matrix, have vertical and horizontal conductors intersecting each of them. To magnetize any one of the matrix cores, it is necessary to energize one of the horizontal conductors and one of the vertical conductors with a current pulse of sufficient strength to drive the particular storage core. This system applies the current coincidence principle of operation. For storing the two binary values "1" and "0" the positive and negative remanence levels of the hysteresis loop are used. Once a particular core has been brought into a certain remanence state it retains that state until the application of a pulse in the opposite direction.

To accomplish the required change of flux for operating a magnetic core matrix efficiently, it has been customary to provide a plurality of driver stages for the rows and columns for complex switching techniques. Vacuum tube circuits have been generally used as core matrix switching and control devices.

According to the present invention a common driver is provided for all vertical or column conductors and all horizontal or row conductors, and a single bi-directional switch is provided for each column and each row conductor. In the disclosed embodiment the switches are of the junction transistor type capable of bi-polar operation and having a low resistance that presents a high output-to-input ratio. Junction transistors are recognized as unique in certain respects, having properties unlike vacuum tubes. In the case of symmetrical junction transistors, operation is capable in two directions, of which vacuum tubes are incapable. A symmetrical transistor provides a fast bi-directional switch, which has greater efficiency than vacuum tubes. The application of a bi-polar switch makes possible substantial economies in respect of the matrix network, since, for example, only one conductor is needed for reading and writing. Such an arrangement also makes it unnecessary to employ diodes.

Therefore the principal object of this invention is to provide a driver switching arrangement for a magnetic core matrix network in which a minimum number of drivers is required.

Another object of this invention is to provide a magnetic core matrix switching arrangement in which the switches are of a transistor type.

Another object is to provide a single transistor switch for each read-write conductor.

Still another object of this invention is to provide a symmetrical transistor type switching arrangement for a magnetic core matrix network in which the transistor operates in one range of its characteristic curve in one of its switching conditions and in another range of its characteristic curve in the other switching condition.

Other objects of the invention will be pointed out in the following description and claims and illustrated in the accompanying drawings, which disclose, by way of examples, the principle of the invention and the best mode, which has been contemplated, of applying that principle.

Figure 1:
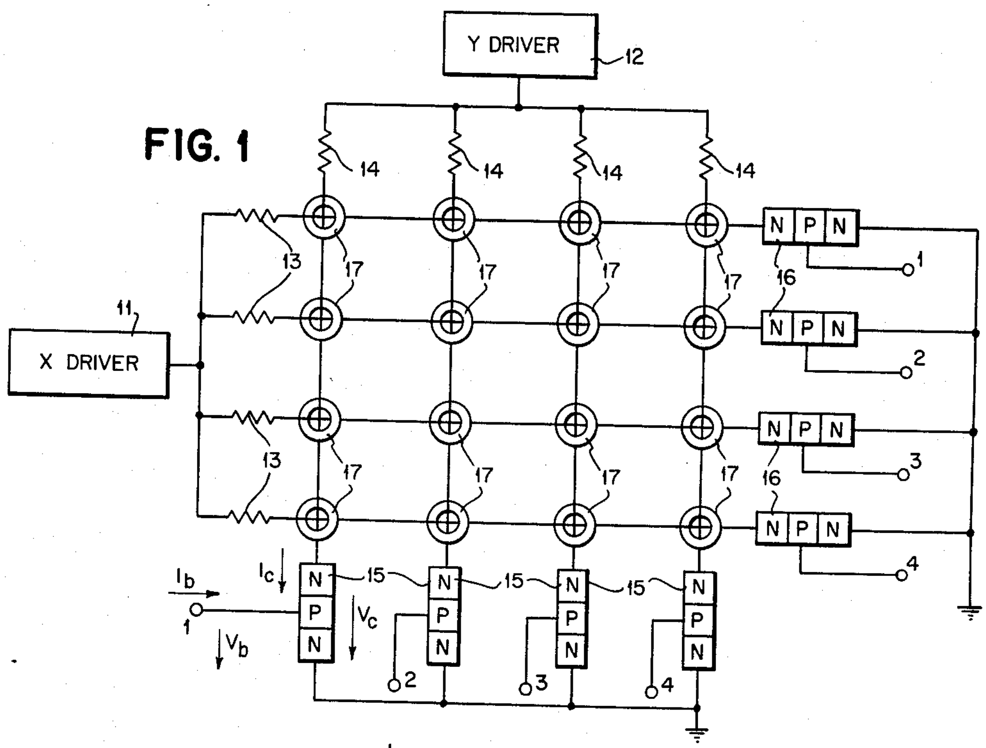
Fig. 1 illustrates the driver switching arrangement in accordance with the invention.

Initially it must be understood that although the circuit of Fig. 1 employs symmetrical junction transistors of the NPN type, other transistors having excellent symmetry may also be employed. Symmetrical transistors are known in the art, and have been discussed, for example, in George Clifford Sziklai, "Symmetrical Properties of Transistors and Their Applications," Proceedings of the IRE, vol. 41, No. 6 (June 1953), pages 717–724, and Arthur W. Lo et al., Transistor Electronics (Prentice-Hall, Inc., 1955), pages 70–75.

As shown in Fig. 1, the magnetic core matrix network includes a plurality of cores 17 each of which has two conductors or windings, in vertical Y and horizontal X directions, passing therethrough. A conventional columnar driver 12 (Y driver) provides appropriate current pulses through a plurality of parallel connected resistors 14 for driving the cores in a vertical direction. A conventional row driver 11 (X driver) provides appropriate current pulses simultaneously through a plurality of parallel connected resistors 13 for driving the cores in the horizontal direction. Each vertical winding is shown connected to the collector element of a different NPN-type transistor 15. The emitter elements of all said vertically controlled transistor switches are commonly connected to ground. Control of each said transistor is provided by an appropriate voltage condition at its base element, such that a suitable voltage applied at column input terminal 1 would operate the transistor switch 15 associated with the first column of the matrix network.

An NPN-type transistor is identically connected in each row of the network. The emitters of the row transistors are commonly grounded, with control of each transistor also being located in the base circuit.

Figure 2:
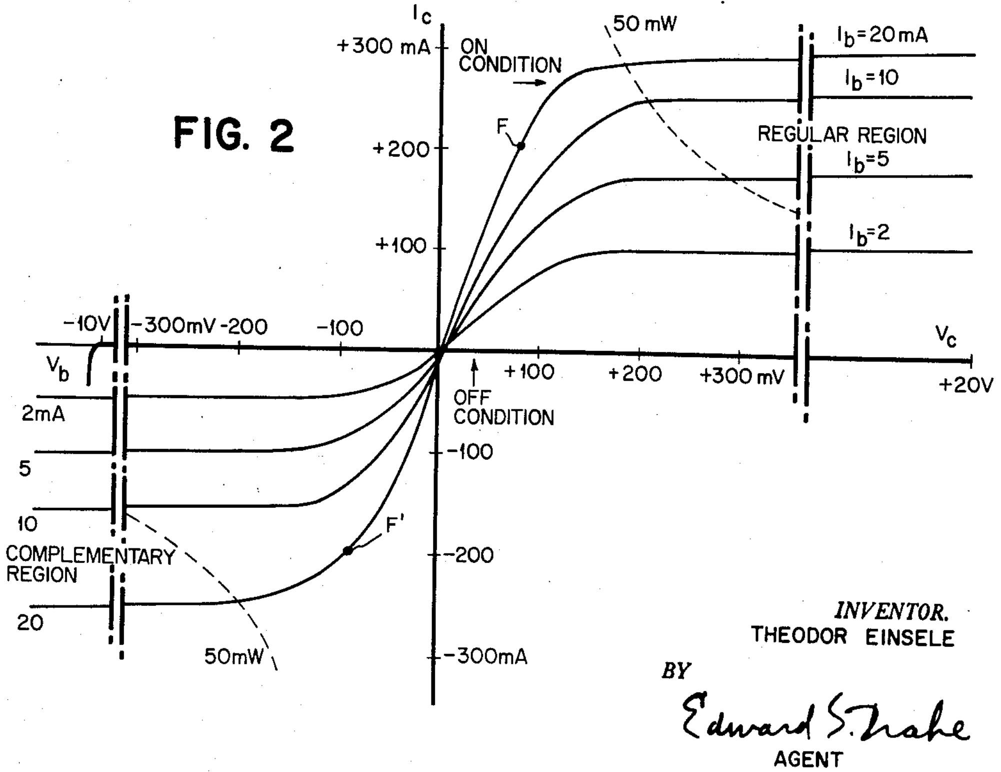
Fig. 2 illustrates the characteristic curve of the transistor employed in the circuit of Fig. 1.

Fig. 2 illustrates the output characteristics of a symmetrical NPN transistor used in the circuit of Fig. 1. The abscissa is the potential drop between the collector and emitter, and the ordinate is the collector current for a group of base currents. The normal range of operation, identified as Regular Region in Fig. 2, lies in the first quadrant, and the opposite range of operation, identified as Complementary Region, is shown in the third quadrant. The transition from the Regular Region of the characteristic curves to the Complementary Region is effected by reversing the polarity of the collector voltage in reading and writing. Current amplification occurs in both Regions.

During normal operation in the first quadrant or Regular Region of the characteristic curve, a few hundred millivolts of negative blocking voltage $V_b$ at the base of a transistor suffice to place the transistor in the OFF condition. However, to develop an OFF condition in the third quadrant, the negative blocking voltage at the base must be greater than the applied collector voltage. When the collector voltage becomes more negative than the base voltage, the base-collector portion of the transistor is controlled in the forward direction. If the collector voltage becomes more positive than the base voltage, the base-collector portion of the transistor is controlled in the reverse direction. Fig. 2 shows how the collector current increases when the collector voltage drops below the applied base voltage $V_b$ of $-10$ volts. The saturation current in this transistor is approximately one microampere in the range of $-10 \geqq V_{ce} \geqq +20$ volts.

The curve of Fig. 2 has been developed for base currents of 2, 5, 10 and 20 milliamperes. The deflection of the curves shows that this transistor is substantially symmetrical. The current gain factor in the Complementary Region is about 80% of that in the Regular Region. The saturation resistance is the same in both the Regular Region and the Complementary Region, or about 0.4 ohm for a base current $I_b$ of 8 milliamperes.

The maximum power loss is an important factor in the life of a transistor. It is a function of the operating temperature, and for the NPN transistor employed in the circuit of Fig. 1, it is 50 milliwatts at 25° C. This limit is not exceeded under static conditions in either the OFF or ON condition of the transistor. This results in the maximum collector current $I_c$ that may be switched in either direction. Taking into consideration the base power loss, the collector current is about 300 milliamperes in the Regular Region and about 240 milliamperes in the Complementary Region. When a core requires a full read and write current of 400 milliamperes, 200 milliamperes has to be switched in the row and column windings of the matrix network. A transistor having the characteristics of Fig. 2 permits this to be accomplished.

Referring to Fig. 1 the symmetrical transistor 15 or 16 is operated in either direction of the characteristic curve of Fig. 2. It may be operated in the load condition or the no-load condition, that is when the collector voltage is at zero level. It is understood that the X and Y drivers 11 and 12 supply positive (read) or negative (write) pulses for energizing core 17. Assuming that the transistor switch is off, controlled by the two drivers, the characteristic curve may be traced in one case to a specific value F when the collector voltage is made positive and to a specific value F′ when the collector voltage is made negative. Assuming a situation where the drivers are emitting a read current pulse at the time that the operational current pulse is applied at the base of a particular transistor 15 or 16, the switch is turned on to operate in the first quadrant of the characteristic curve of Regular Region. This switch may then be turned off by applying a blocking bias to its base. Conversely, when the drivers are prepared to write information into the matrix network, they provide negative pulses for the horizontal and vertical conductors. This will cause an increase of collector current in the opposite direction, and bring about operation of the transistor switch in the third quadrant of its characteristic curve. Again a blocking bias may be applied to the base to turn the transistor switch off when the reading or writing operation is completed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a core storage matrix circuit of the type comprising a plurality of cores capable of assuming bistable states of magnetic remanence, each of which is interconnected by a pair of windings in the horizontal and vertical directions, single means for energizing all said horizontal windings simultaneously, single means for energizing all said vertical windings simultaneously, and single symmetrical junction transistors capable of bipolar operation associated with each said horizontal and vertical winding to selectively control energization of said cores in either direction for reading and writing.

2. The invention according to claim 1, wherein said transistor is of the NPN type.

3. In a core matrix circuit for storing data in columns and rows representing value orders, comprising cores capable of assuming bistable states of magnetic remanence, a first drive means and a second drive means, a plurality of parallel connected horizontal and vertical conducting wires controlled by a different one of said drive means and wherein each said core is coupled by one of said vertical and one of said horizontal conducting wires, and a plurality of parallel connected symmetrical junction transistors capable of bipolar operation, with each said transistor being connected between each said wire and ground.

4. The invention according to claim 3 wherein each of said transistors comprises a collector element, an emitter element and a base element, with the collector element being directly connected to its associated conducting wire, and the emitter element being connected to ground, operational control of said transistor being provided by the base element.

5. In a core matrix circuit for storing data in columns and rows of cores capable of assuming bistable states of magnetic remanence and representing value orders, comprising a first drive means and a second drive means, a plurality of parallel connected vertical conductors energized by said first drive means, a plurality of parallel connected horizontal conductors energized by said second drive means, a pair of said horizontal and vertical conductors being passed through each of said cores, a plurality of symmetrical junction transistors capable of bipolar operation means one of which being associated with a different horizontal and vertical winding, an operational source for providing control signals for operating said transistors, with one transistor associated with a vertical winding and one transistor associated with a horizontal winding being energized simultaneously for controlling the energization of select ones of said cores, and accomplishing reading and writing in said core matrix circuit.

6. The invention according to claim 5 wherein said transistors include a collector element, an emitter element and a base element, with said collector element being connected directly to its associated winding, said emitter element being connected to ground and said base element being connected to said operational source.

7. The invention according to claim 6 wherein said transistor is operated in a normal range of its characteristics in one of its switching conditions and in the complementary range of its characteristics in the other switching condition.

8. The invention according to claim 7 wherein the transistor is switched from one range of its characteristics to the other range of its characteristics by the polarity reversal at the collector element provided by the associated drive means.

9. In a storage circuit of the type comprising a plurality of cores capable of assuming bistable states of magnetic remanence and arranged in a matrix, a first single drive means and a second single drive means for providing read and write control voltages of opposite polarity, a plurality of parallel connected X coordinate conductors interconnecting said rows of cores and energized simultaneously by said first drive means, a plurality of parallel connected Y coordinate conductors interconnecting columns of cores and energized simultaneously by said second drive means, a single symmetrical junction transistor capable of bipolar operation associated with each said X and Y coordinate conductor, a source of current pulses of a predetermined magnitude for operating selectively X and Y pairs of said transistors bi-directionally in accordance with the read or write control voltages provided by said first and second drive means.

References Cited in the file of this patent

UNITED STATES PATENTS

| | | |
|---|---|---|
| 2,734,184 | Rajchman | Feb. 7, 1956 |
| 2,739,300 | Haynes | Mar. 20, 1956 |

OTHER REFERENCES

Publication I: An article entitled, "A Transistor Digital Fast Multiplier with Magnetostrictive Storage," by G. B. Chaplin et al., published July 1955, Proc. of the I.E.E. (Part B, vol. 102, No. 4), pages 412–424.

UNITED STATES PATENT OFFICE

CERTIFICATE OF CORRECTION

Patent No. 2,939,119 May 31, 1960

Theodor Einsele

It is hereby certified that error appears in the printed specification of the above numbered patent requiring correction and that the said Letters Patent should read as corrected below.

Column 4, line 9, for "transistors" read -- transistor --; line 44, strike out "means".

Signed and sealed this 15th day of November 1960.

(SEAL)
Attest:

KARL H. AXLINE
Attesting Officer

ROBERT C. WATSON
Commissioner of Patents